Sept. 23, 1930.   T. D. BASCOM   1,776,675
CHUCK
Filed June 12, 1929
Fig. 1.
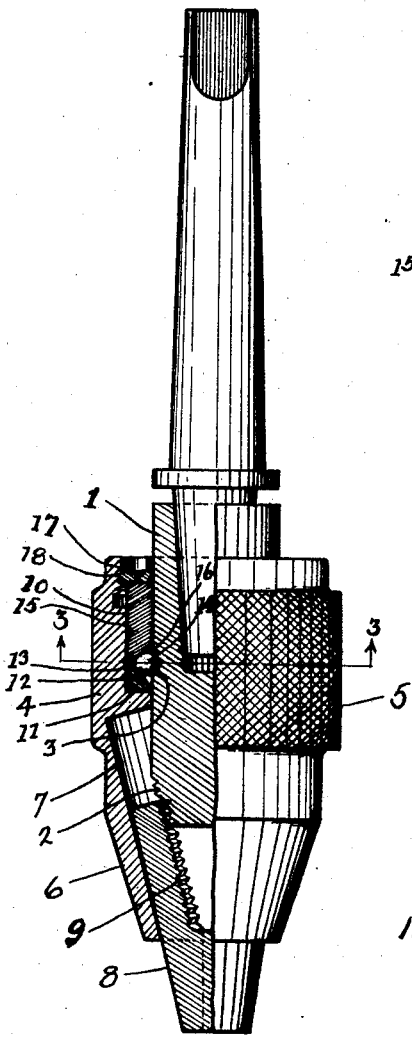
Fig. 3.
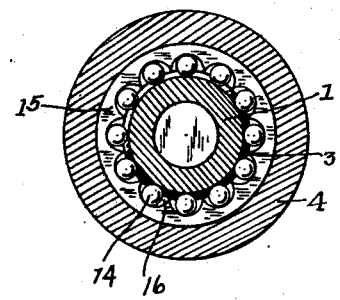
Fig. 2.
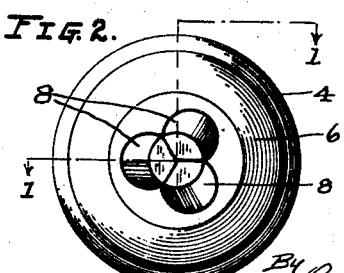
Fig. 4.
INVENTOR
Thomas D. Bascom
By Burkett, Hyde, Higley & Meyer
ATTORNEYS Patented Sept. 23, 1930

1,776,675

UNITED STATES PATENT OFFICE

THOMAS D. BASCOM, OF CLEVELAND, OHIO, ASSIGNOR TO THE STANDARD TOOL CO., OF CLEVELAND, OHIO, A CORPORATION OF OHIO

CHUCK

Application filed June 12, 1929. Serial No. 370,261.

The invention disclosed in this application relates to chucks.

The object of this invention is to improve the mechanism of a chuck, such as is used on drill presses and the like, so that a drill or tap applied to the chuck is firmly held in place for use and at the same time is readily released by a simple hand operation without undue straining on the part of the operative and without the use of a wrench or any other means.

Specifically, the invention relates to a ball clutch arrangement between the shank and sleeve and is of a type such that by simple hand operation the chuck may be firmly set upon the drill or other tool by a plurality of ball clutches and at the same time the ball clutches will readily release the parts to remove the drill or other tool by a simple hand operation.

The invention is very well set forth in the following description, drawings, and claims.

Referring to the drawings, Fig. 1 is a view partly in elevation and partly in section; Fig. 2 is a chuck end elevation; Fig. 3 is a section upon the line 3—3 of Fig. 1; and Fig. 4 is a fragmentary view of the plain race and the chuck ring through one of the cam recesses with the ball removed.

In the drawings, 1 represents a shank which is adapted to be secured in a machine tool, in any suitable manner. This shank is provided at its lower end with a threaded portion indicated at 2 and which is tapered, as is customary in devices of this sort. The shank is also provided, at a point substantially midway of its length, with an annular ball race 3 surrounding the shank and having the usual plain bearing. Upon it is the sleeve 4 with a knurled face 5 for providing a good hand grip, and the usual tapered end portion 6 is provided with three diagonal guide-ways 7 of substantially cylindrical formation. Engaging these guide-ways 7 are the jaws 8 each provided with a threaded portion 9 for engagement with the threaded portion 2 of the shank.

In order to hold the sleeve 4 against endwise movement on the shank so that the jaws may be manipulated in the usual manner, the sleeve 4 is counter-bored at 10 to provide a shoulder 11. This shoulder receives a ball bearing race 12 having a plain inclined bearing surface 13 for engaging balls 14 which also engage in the ball race 3. Above the balls is another sleeve 15 having a free fit in the counter-bore 10 and provided at its lower end with circumferentially spaced recesses 16 generally half round and having a radius slightly greater than the radius of the balls 14. The sleeve 15 is held in place by a suitable checknut 17 threaded at 18 into the sleeve. The lower end of this sleeve is forced down snugly against the ball race 12 and the clearance between the parts is such that the balls are free to move in the recesses 16 when the chuck is not in clamped position, but are jammed between the walls of the recesses and the ball race 12 to form a lock between the sleeve and the shank when the sleeve is moved endwise along the shank by the tightening of the chuck. In operation the sleeve can be turned freely for adjusting the chuck to the drill or other tool but when the jaws meet with resistance by engaging the drill then the sleeve tends to move endwise along the shank and the balls are forced to one side and are jammed against the curved side walls of the recesses 16 when the chuck is locked in working position. As the chuck tightens in use the jamming of the balls is greater and the drill or other tool is held more firmly. When the drill or other tool is to be removed the operator merely engages the knurled portion 5 and rotates it in the release direction and very slight movement and pressure are necessary because the curved sides of the recesses 16 readily release the balls.

It is evident from the foregoing that the ball clutch mechanism herein described could lock or hold the sleeve with respect to the shank in either direction of rotation of one with respect to the other, but in normal operation when there is no drill or other tool in the chuck the parts move and operate with sufficient ease so that there is not enough friction or resistance to the movement of the parts to produce sufficient opposite outward thrust between the sleeve and the shank to cause a clutching operation. It might well be that if the guides and the jaws become clogged with chips so that there was considerable resistance to proper movement of these parts, there would be enough friction to produce opposite outward end thrust of the sleeve and shank so that a clutching action would take place, but with the parts moving normally and freely the chuck may be opened and closed without any difficulty in order to adjust it to the tool, and when applied thereto, will firmly grip the same and indeed, will tighten upon the tool during operation. When it is desired to release the chuck it is only necessary to turn the sleeve by hand, when the ball clutches will release freely and permit the removal of the tool.

I claim:

1. In a chuck of the class described, a shank having a tapered threaded portion at its outer end and a ball recess within its outer threaded end, a clutch sleeve having internal jaw guideways converging to and opening out at the end, jaws slidable in said guideways and having threaded portions engaging the threaded end of the shank, a plain ball bearing race carried by the sleeve and arranged between the ball bearing groove of the shank and the jaw end of the sleeve, a plurality of balls arranged between said plain race and the walls of the ball bearing groove in the shank, and a ball clutch member having a plurality of camming recesses one for each ball and carried by the sleeve, said parts being arranged so that upon the clamping of the jaws on the tool there are opposing outward thrusts of the sleeve and shank causing the cams of the clutch member to jam the balls between them and a wall of the ball bearing groove in the shank.

2. A chuck of the class described in claim 1 wherein the clutch member comprises an annular ring with its camming recesses formed by a group of symmetrically disposed half-cylindrical recesses cutting the inner corner of the ring where the balls are located, the radius of the recesses being greater than that of the balls which they receive.

In testimony whereof I hereby affix my signature.

THOMAS D. BASCOM.